M. B. Gould and W. S. Shaw's
Automatic
Improved Feed Box for Horses &c.

No. 120,906.

Patented Nov. 14, 1871.

Witnesses.
Geo. H. Hughson
C. H. Woodward.

Inventors.
Winfield S. Shaw
Marcus B. Gould

UNITED STATES PATENT OFFICE

WINFIELD S. SHAW AND MARCUS B. GOULD, OF BUFFALO, NEW YORK.

IMPROVEMENT IN FEED-BOXES.

Specification forming part of Letters Patent No. 120,906, dated November 14, 1871; antedated November 1, 1871.

*To all whom it may concern:*

Be it known that we, WINFIELD S. SHAW and MARCUS B. GOULD, of the city of Buffalo, in the county of Erie and State of New York, have invented an Improved Automatic Feed-Box for feeding horses and other animals, of which the following is a specification:

This invention relates to the construction of an automatic feed-box to be used principally in feeding horses, although it may be adapted to the feeding of other animals.

Figure 1:
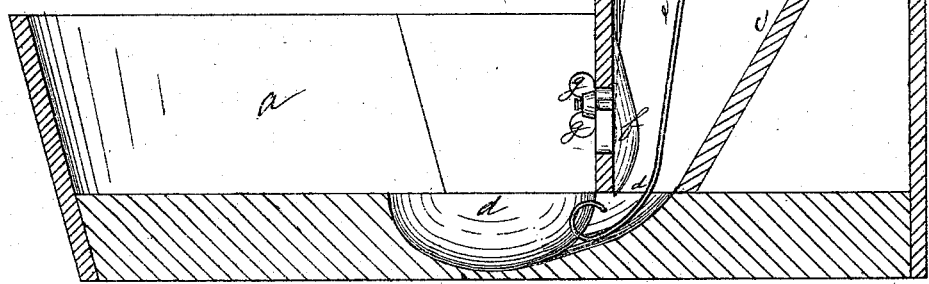
Figure 2:
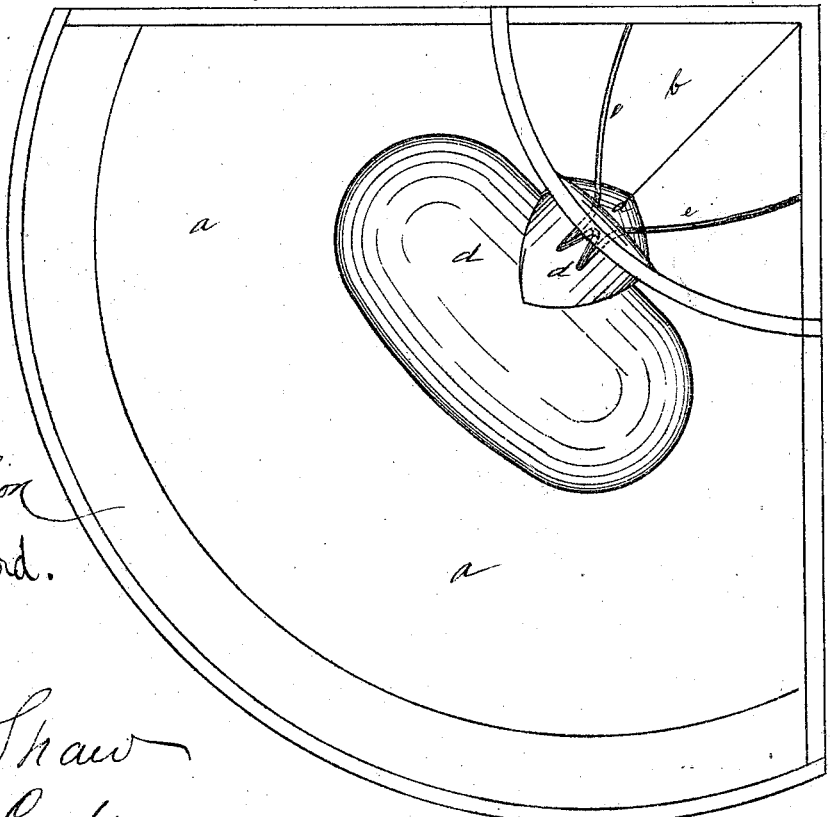

Figure 1 is a side sectional view. Fig. 2 is a plan.

The box part may be made of wood or iron, in any convenient form; but we prefer a quadrant form, so as to be adapted to a corner, with an elevated flange on the outer edge of some three inches in height. It is represented in the drawing by the letters $a\,a\,a$. On the back corner the elevated reservoir is constructed resting upon and secured to the feed-box and carried up to any height desired, and this is designated by the letters $b\,b$. This reservoir has a cover, which may be secured by a lock, and the reservoir may be made funnel-shaped at the bottom; or it may be arranged internally so as to conduct the feed to the opening in the bottom, which communicates with the oval depression or receptacle outside of the reservoir. This opening and receptacle is designated by the letters $d\,d\,d$, and is made sufficiently large to admit of the grain or feed to pass down to supply the receptacle and to allow the horse to feed, and to furnish feed as fast as he consumes it. A spring-wire, $e\,e$, is fastened on the inside of the reservoir on each side, and extends down through the opening in the bottom of the reservoir and a short distance into the depression and receptacle $d\,d\,d$ on the outside of the reservoir, so that the lips of the horse will readily move the same and agitate the grain or feed, to facilitate its discharge and prevent its clogging. In order to increase or diminish the supply of feed a slide, $f$, with a set-screw, $g$, is fastened as seen in the drawing, whereby the opening from the reservoir is regulated to increase or diminish the supply of feed.

Many advantages are secured by this feed-box, and among them are its cheapness, the saving of feed, and the slowness with which it is consumed, so as to insure its complete mastication. It is quite portable in form, and can be readily attached to any stall by means of hooks or screws.

Having thus described said invention, what we claim as our invention is—

1. In an automatic feed-box, constructed substantially as described, the depression or basin $d$, for the purpose set forth.

2. In combination with a feed-box, constructed substantially as described, the wires $e$ arranged within the elevated reservoir $b$, and operated in the manner and for the purpose set forth.

WINFIELD S. SHAW.
MARCUS B. GOULD.

Witnesses:
H. U. SOPER,
GEO. H. HUGHSON.

(63)